United States Patent [19]

Kos et al.

[11] Patent Number: 4,700,081
[45] Date of Patent: Oct. 13, 1987

[54] SPEED AVOIDANCE LOGIC FOR A VARIABLE SPEED WIND TURBINE

[75] Inventors: Joseph M. Kos, Holyoke, Mass.; Allen F. Rapp, Granby, Conn.

[73] Assignee: United Technologies Corporation, Hartford, Conn.

[21] Appl. No.: 856,902

[22] Filed: Apr. 28, 1986

[51] Int. Cl.$^4$ .............................................. F03D 9/00
[52] U.S. Cl. .......................................... 290/44; 290/55
[58] Field of Search ................. 290/44, 42, 43, 52–55; 322/35, 41, 29; 416/132 A, 132 B, 30, 35, DIG. 4; 415/1–8, 17

[56] References Cited

U.S. PATENT DOCUMENTS

| | | | |
|---|---|---|---|
| 4,160,170 | 7/1979 | Harner et al. | 290/44 |
| 4,161,658 | 7/1979 | Patrick | 290/44 |
| 4,189,648 | 2/1980 | Harner | 290/44 |
| 4,193,005 | 3/1980 | Kos et al. | 290/44 |
| 4,339,666 | 7/1982 | Patrick et al. | 290/44 |
| 4,400,659 | 8/1983 | Barron et al. | 322/35 X |
| 4,420,692 | 12/1983 | Kos et al. | 290/44 |
| 4,435,647 | 3/1984 | Harner et al. | 290/44 |
| 4,481,459 | 11/1984 | Mehl et al. | 322/29 X |
| 4,503,673 | 3/1985 | Schachle et al. | 290/44 X |
| 4,511,807 | 4/1985 | Somerville | 290/44 |
| 4,565,929 | 1/1986 | Baskin et al. | 290/44 |
| 4,584,486 | 4/1986 | Quynn | 290/44 |

*Primary Examiner*—William M. Shoop, Jr.
*Assistant Examiner*—Sharon D. Logan
*Attorney, Agent, or Firm*—Francis J. Maguire, Jr.

[57] ABSTRACT

A variable speed wind turbine is controlled in a way which avoids the turbine lingering at a critical speed which would otherwise tend to cause excessive vibration. The disclosed method and apparatus increases speed at a selected rate with respect to generator output power except in the vicinity of the critical speed. The selected rate is changed in the vicinity of the critical speed to a different rate which is selected slower in the selected embodiment, to avoid commanding the critical speed. After the output power increases or decreases beyond the critical point, a deliberate discontinuity in the speed command signal is induced. A rapid speed change through the critical speed is accompanied by a corresponding power output change. If the speed is increasing at a selected slower rate below the critical speed, and the speed command signal is stepped to a higher level just before reaching the critical speed, the speed will rapidly increase and quickly pass through the critical speed while the power output decreases. Similarly, if the speed is decreasing at a selected slower rate above the critical speed, and the speed command signal is stepped to a lower level just before reaching the critical speed, the speed will rapidly decrease and quickly pass through the critical speed while the power output increases.

3 Claims, 7 Drawing Figures

STATE TRANSITION DIAGRAM

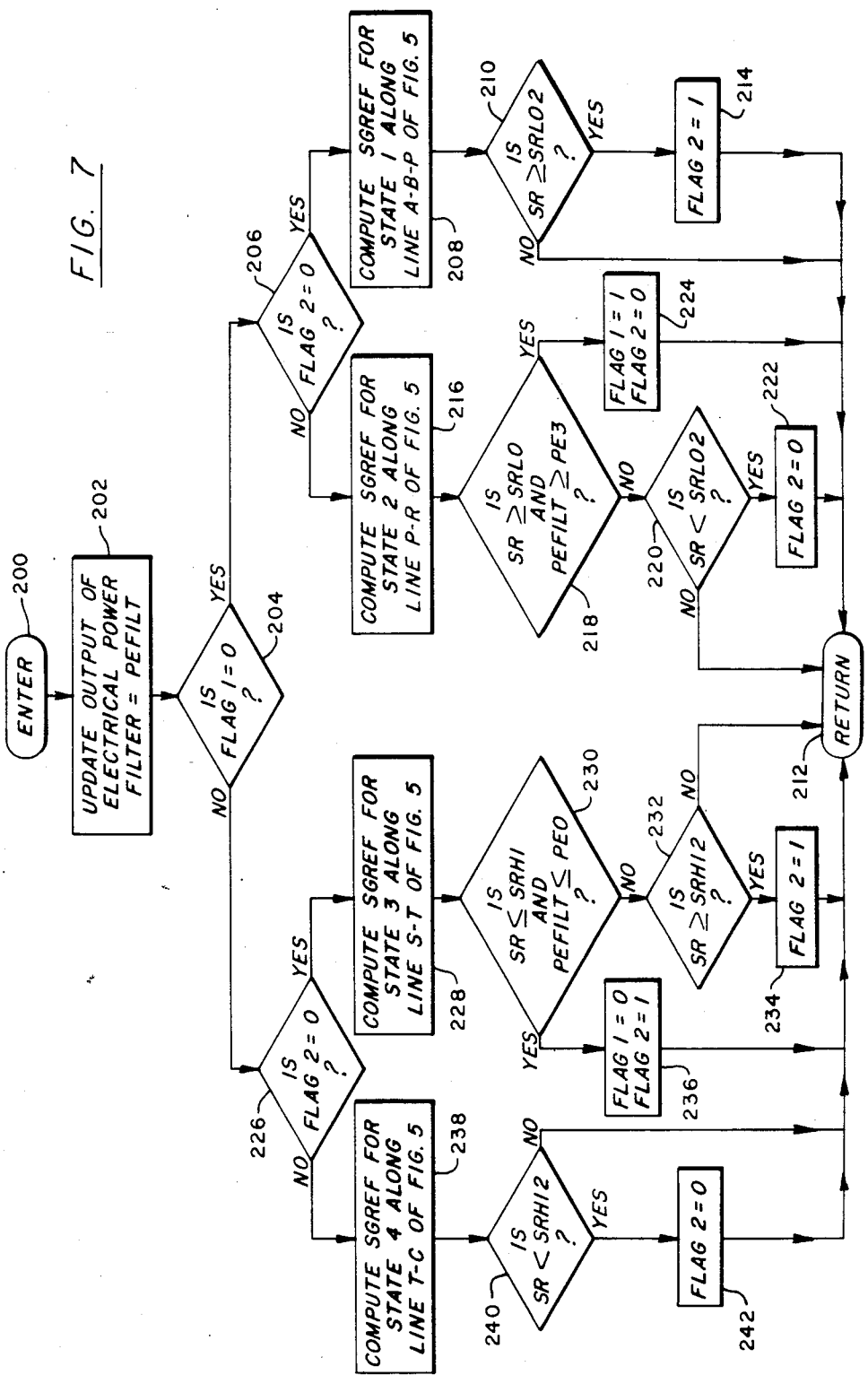

4,700,081

SPEED AVOIDANCE LOGIC FOR A VARIABLE SPEED WIND TURBINE

REFERENCE TO RELATED APPLICATIONS

The invention described herein may employ some of the teachings disclosed and claimed in commonly owned pending applications having U.S. Ser. No. 799,046, filed on Nov. 18, 1985, invented by DiValentin et al, entitled TORQUE CONTROL FOR A VARIABLE SPEED WIND TURBINE, and U.S. Ser. No. 799,045, filed on Nov. 18, 1985, invented by Doman et al, entitled A VARIABLE SPEED WIND TURBINE, both of which are hereby expressly incorporated by reference.

TECHNICAL FIELD

This invention relates to wind turbines, and particularly to variable speed wind turtines.

BACKGROUND ART

Various types of wind machines including constant rotor speed and adjustable speed machines are known. Since the turbine-generator is normally directly connected to a fixed frequency electrical power grid constant speed wind turbines have predominated. Variable speed wind turbines cannot be directly connected to the grid because of their variable frequency electrical power output. This necessitates the interposition of a frequency converter between the generator and the grid to make the frequency conversion. Various techniques are well known for such frequency converters including cycloconverters and rectifier-inverters. However, such techniques have not been generally applied to the wind turbine art.

In the variable speed motor drive art, electronic speed control techniques have been developed for all types of motors using the thyristor, or silicon-controlled rectifier (SCR). It has beccme apparent to wind energy theorists that it is possible to use an adjustable speed AC drive in reverse. In other words, instead of using the adjustable speed drive as a receiver of fixed frequency AC for conversion to variable frequency AC for driving a motor, it is possible to provide the frequency converter with variable frequency AC from an AC generator for conversion to fixed frequency AC for supplying a power grid.

As known in the wind energy art, the kinetic energy available from an oncoming wind stream varies as the size of swept area, density, and cube of the wind velocity. It has been shown that no more than 59% of the energy can be extracted and the ability of any wind turbine to approach that maximum has been named the coefficient of performance, $C_p$. Cp is related to the aerodynamic features of a given machine, particularly the tip speed ratio, which is defined as the ratio of tangential speed of the blade tip over the speed of the oncoming wind. If this ratio can be maintained at the machine's peak coefficient of performance by letting rotor speed follow wind speed, the wind turbine becomes highly efficient. In addition, variable speed wind turbines provide the opportunity for short term energy storage. I.e., wind speed transients can be integrated into speed changes.

A control strategy for such a wind turbine, based in part on electrical adjustment of generator torque was disclosed and claimed in the pending applications noted at the beginning of this application. There, generator torque is electrically adjusted to maneuver speed to obtain peak performance. This is accomplished by use of a variable speed wind turbine controller responsive to both sensed generator speed and generator power output signals. It provides a generator torque command signal to a frequency converter which in turn controls the air gap torque in the generator by controlling the level of power delivered to the power grid. The sensed power signal is provided to the controller which consults a look-up table constructed according to a desired functional relationship between generator output power and the corresponding speed necessary to obtain optimum performance or to obtain maximum throughput of energy. The controller provides a speed reference or speed command signal which is compared to the sensed generator speed signal. A difference signal indicative of the difference therebetween is integrated to provide the generator torque command signal for the frequency converter.

The air gap torque between the generator stator and rotor is effectively controlled by the generator torque command signal provided by the variable speed wind turbine controller. In effect, however, the variable speed wind turbine controller operates, at lower windspeeds, to maneuver the generator speed according to the function defining generator speed versus generator electrical power output residing in the look-up table. This function is defined in such a way that the speed maneuvers tend to cause the wind turbine to operate on the wind turbine power coefficient versus velocity ratio optimum performance curve substantially at the peak thereof, for increased efficiency.

For increased wind speeds above a selected limiting torque, the generator torque command signal holds torque essentially constant and permits the turbine rotor to operate at speeds greater than dictated by the constant velocity ratio up to a speed limit. Preferably, the constant generator torque command signal can be utilized without aerodynamic torque control in order to maximize generator output power by causing the wind turbine to operate substantially on the power coefficient versus velocity ratio optimum performance curve and increase its speed above the windspeed for the selected limiting torque until the speed limit is reached. In either case, there will be certain speeds within the operating range at which system resonances will occur. The resonances can be particularly severe at some speeds and pose potential vibration problems which are potentially most severe in consequence.

DISCLOSURE OF THE INVENTION

The object of the present invention is to provide a critical speed avoidance method and apparatus for use in controlling the speed of a variable speed wind turbine-generator.

According to the present invention, the generator torque is controlled in a manner which maneuvers the rotor tip speed with respect to wind speed. Above a torque limit, the generator torque is controlled in such a way as to maneuver the rotor tip speed at speeds greater than those dictated by the constant velocity ratio up to a speed or power limit. The greater speeds achieved are generally commanded via a speed command signal which increases at a selected rate, which may be linear, with respect to generator power output except as described below.

In further accord with the present invention, the disclosed method and apparatus increases speed at a selected rate, which may be linear, with respect to generator output power except in the vicinity of the critical speed. If the selected rate is linear, it is changed to a slower linear rate just below and just above the critical speed in order, respectively, to permit the output power to increase or decrease beyond the critical point. A critical speed avoidance discontinuity is then provided in the speed command signal which causes a rapid speed change through the critical speed, accompanied by a corresponding power output change.

In still further accord with the present invention, if the speed is increasing below the critical speed and the speed command signal is stepped to a higher level just before reaching the critical speed, the speed will rapidly increase and quickly pass through the critical speed while the power output decreases. Similarly, if the speed is decreasing above the critical speed and the speed command signal is stepped to a lower level just before reaching the critical speed, the speed will rapidly decrease and quickly pass through the critical speed while the power output increases.

In still further accord with the present invention, the speed increases at the selected rate until reaching a first lower speed limit below the critical speed. The first lower speed limit coincides with a first generator output power boundary. At that point, the selected rate of increase is decreased to a lower rate of increase along a lower low-rate line until a second power boundary is reached, corresponding to a second lower speed limit just below the critical speed. At that point, further speed increases, whether induced by a wind gust or otherwise, will be accompanied by an instantaneous step change in the commanded speed level to a value well above the critical speed. The wind turbine will rapidly increase its speed by a reduction in generator air gap torque and quickly pass through the critical speed while at the same time the generator output power will decrease to some extent in order to accomodate the rapid speed increase. From that point on, changes in the commanded speed will also be at the same reduced linear rate but on an upper low-rate line. For speed increases the speed will increase until the second power boundary is once again reached, at which point the selected rate of command signal change will be reasserted. Any subsequent decreases in speed which fall below a fourth speed limit corresponding to juncture of the upper low-rate line and the selected line will again be controlled at the reduced rate of change along the upper low-rate line. Further reductions may occur down to a third speed limit just above the critical speed corresponding to the first power boundary. Any further speed decreases below that point will be accompanied by a step decrease in the command signal level to a point on the lower low-rate line, and so on.

Thus, the present invention provides an effective method and means for avoiding a critical speed which may cause undesirable vibrations in a wind turbine. The method takes into account the desirability of maintaining the maximum efficiency speed rate of increase line while at the same time avoiding that rate of increase where it could result in commanded speeds corresponding to the critical speed.

These and other objects, features and advantages of the present invention will become more apparent in light of the detailed description of a best mode embodiment thereof, as illustrated in the accompanying drawing.

BRIEF DESCRIPTION OF THE DRAWING

FIG. 7 is a simplified flowchart illustration of a subroutine in a computer program for controlling a wind turbine which shows how the speed avoidance technique of the present invention might be implemented on a special purpose digital computer.

BEST MODE FOR CARRYING OUT THE INVENTION

Figure 1:
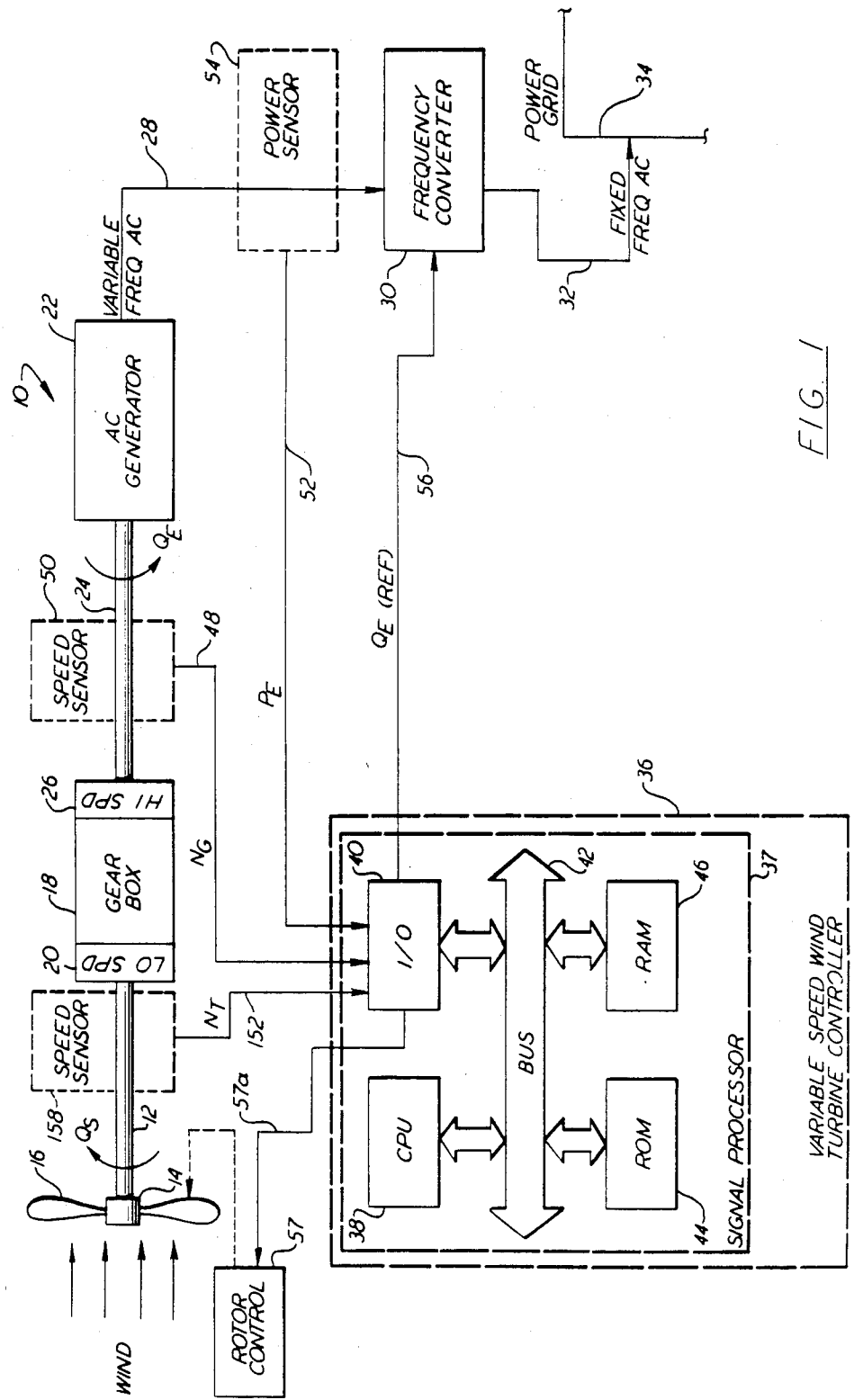
FIG. 1 is a simplified block diagram illustration of a variable speed wind turbine and controller.

FIG. 1 is an illustration of a variable speed wind tubine 10. A turbine rotor shaft 12 with a hub 14 at one end thereof has at least one blade 16 attached to the hub. A gearbox 18 has a low speed side 20 attached to the other end of the turbine rotor shaft. An AC generator 22 has a generator rotor shaft 24 attached to a high speed side 26 of the gearbox. The turbine rotor torque ($Q_s$) drives the generator rotor through the gearbox. The generator provides an air gap torque ($Q_E$) which opposes the geared input turbine rotor torque. The AC generator provides variable frequency AC on a line 28 to a frequency converter 30 which converts the variable frequency AC to a fixed frequency AC on a line 32 which is in turn provided to a power grid 34.

A variable speed wind turbine controller 36 includes a signal processor 37 in which there is a CPU 38 and an I/O unit 40 which interfaces with a bus 42. The signal processor may also include a ROM unit 44 and a RAM unit 46 as well as other hardware (not shown). The signal processor's I/O unit is responsive to a sensed generator speed signal ($N_G$) on a line 48 provided by a speed sensor 50 which is responsive to the generator shaft speed. Of course, it will be understood that an actual speed measurement could be taken as well in other areas with suitable signal scaling, e.g., on shaft 12 as will be described in more detail below. The I/O unit 40 is also responsive to a sensed power signal ($P_E$) on a line 52 from a power sensor 54 responsive to the magnitude of power provided on the line 28 to the frequency converter. It will also be understood that the variable frequency AC output of the generator is not the only source of such a power output indication. The variable speed wind turbine controller 36, by means of the signal processor, in effect determines what the generator air gap torque should be according to a function defining sensed power versus generator speed to obtain maximum efficiency. After determining what this level should be, the signal processor provides, through its I/O unit 40, a generator torque command signal on a line 56 to the frequency converter.

The frequency converter may, for example, be a cycloconverter or a rectifier-inverter pair linked by a DC link. Both of these types of frequency converters, and others, are well known in the art and need not be discussed in detail here. Suffice it to say that the electronic-type converters use phase-controlled SCRs to control the power flow through the frequency converter. This is done by controlling the phase angle of firing of the SCR gates with respect to the phase of the utility grid in order to control the flow of real and reactive power. Thus, there will generally be a trigger circuit (not shown) within the frequency converter which is responsive to the torque command signal and which provides triggering pulses for the SCRs within the frequency converter. As previously indicated, a detailed description of the frequency converter and the triggering circuitry is unnecessary here and will not be presented as these details are well known in the frequency converter art.

A rotor control 57 may be provided to provide aerodynamic torque control above a limiting torque in order to limit thrust. This may take the form of blade pitch or turbine yaw control.

Figure 2:
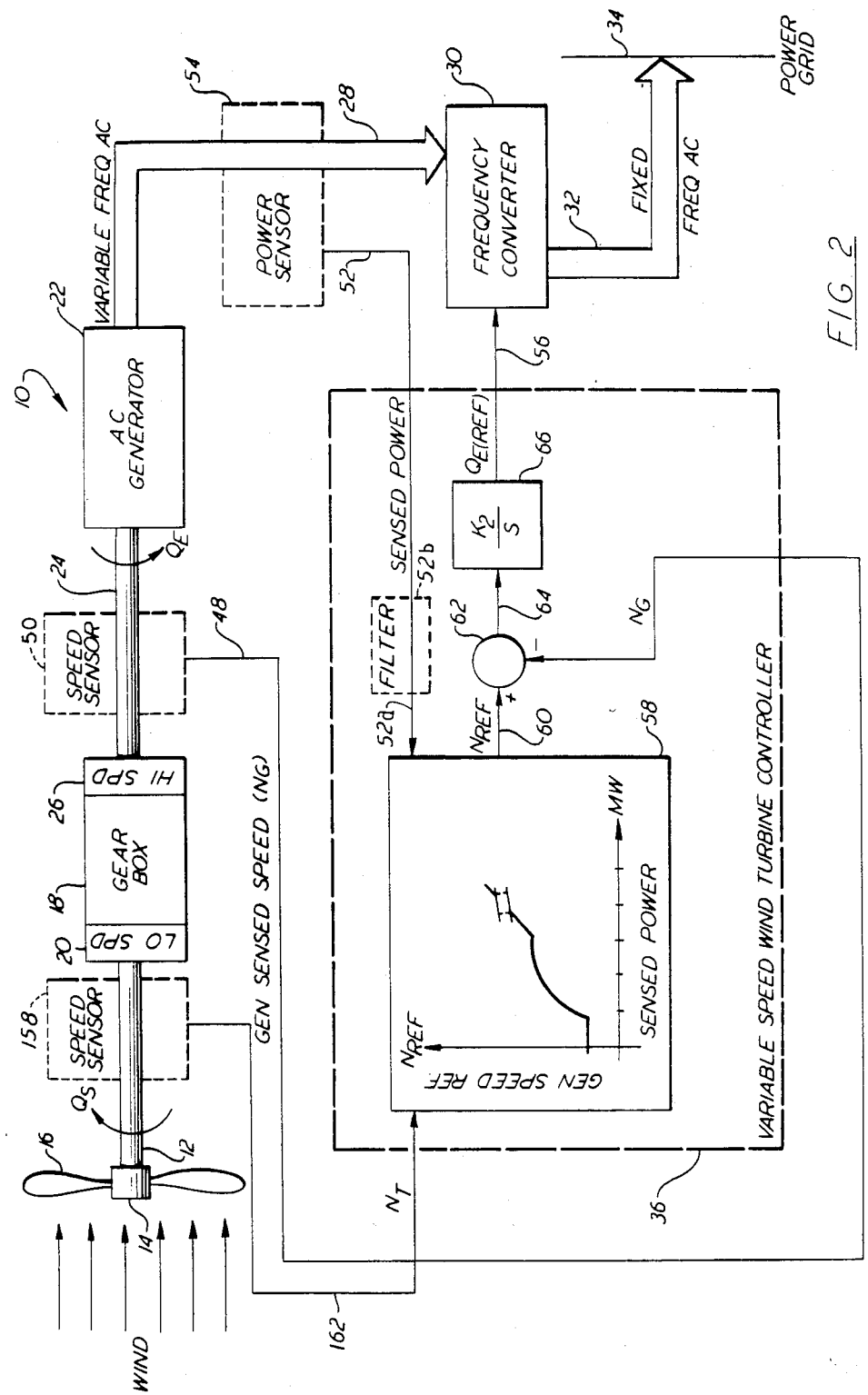
FIG. 2 is a simplified block diagram illustration of a variable speed wind turbine similar to that of FIG. 1 except showing the wind turbine controller in a stylized system level diagram format which aids in understanding some aspects of the present invention.

FIG. 2 is similar to FIG. 1, except it shows the variable speed wind turbine controller of FIG. 1 in a simplified system level format as an aid for better understanding the central teachings of the present invention. In FIG. 2, the variable speed wind turbine controller is shown responsive to the same sensed speed and power signals 48, 52 and also providing the same command torque signal on the line 56 to the frequency converter 30. A filter 52b, which is of the low pass type, provides a filtered power output signal on a line 52a to a schedule 58. A turbine rotor speed signal on a line 162 is also provided to the schedule 58. It will be observed that the signal orocessor hardware of FIG. 1 has been replaced by functional blocks which more fully illustrate the control approach taught by the present invention. The schedule 58, which in the digital embodiment of FIG. 1 may include a look-up table, is responsive to the filtered sensed power signal on the line 52a, the sensed power signal on line 52, and the turbine rotor speed signal on line 162. The schedule includes a functional relationship between sensed power signal values and corresponding generator speed reference (command) signal values. In response to sensed power signal levels the speed reference signal ($N_{REF}$) is output on a line 60 to a summing junction 62 where a comparison is made between the speed reference signal on the line 60 and the sensed generator speed signal on the line 48. A difference signal on a line 64 is integrated by an integrator 66 which provides the torque command signal on the line 56 to the the frequency converter 30. Thus, it will be seen that the function of the signal processor CPLU 38 of FIG. 1 in conjunction, for example, with the ROM 44, which may include a look-up table, is to sense the level of power delivered by the generator and from that sensed level of power to determine the generator speed at which maximum efficiency is attained (by consulting a pre-programmed look-up table, ROM 44, or schedule 58). A speed reference signal is then generated by the controller and compared with a generator sensed speed signal. The difference is integrated to provide a torque command signal to the frequency converter for controlling the power flow to the power grid 34 and hence for controlling the air gap torque in the AC generator.

Figure 3:
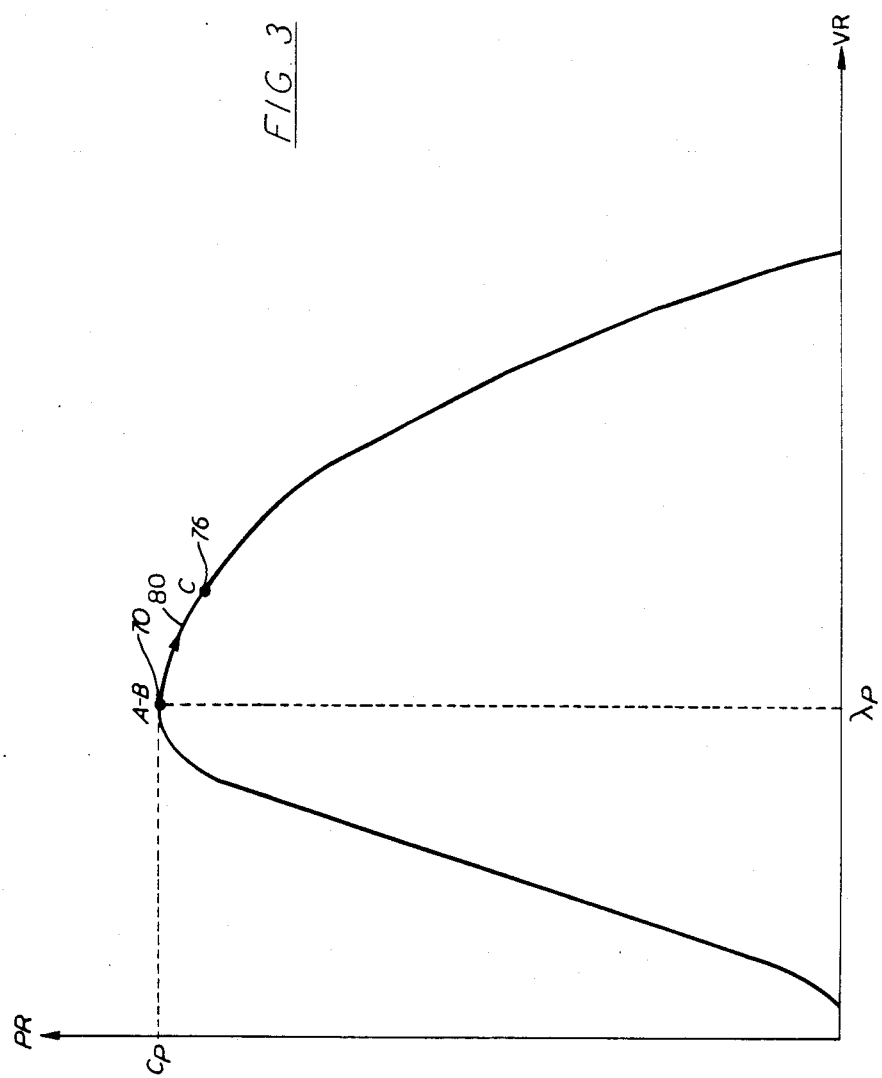
FIG. 3 is an illustration of a performance map for a particular wind machine illustrating the relation between the coefficient of performance, PR or $C_p$, and the tip speed ratio or velocity ratio, VR.

FIG. 3 is an illustration of a performance map for a particular wind machine, illustrating the relation between the coefficient of performance and the tip speed ratio ($C_p$), otherwise known as the velocity ratio (VR). For fixed speed wind turbines it was not possible to operate at the peak of the performance map since the wind speed varies. However, in a variable speed wind machine the velocity ratio can be held constant by having the tip speed follow the wind speed to maintain the ratio. Thus, in a variable speed wind turbine, for maximum efficiency, the design must attempt to keep the velocity ratio at the point at which the coefficient of performance is maximized. This point corresponds to point A-B (70) in FIG. 3.

Figure 4:
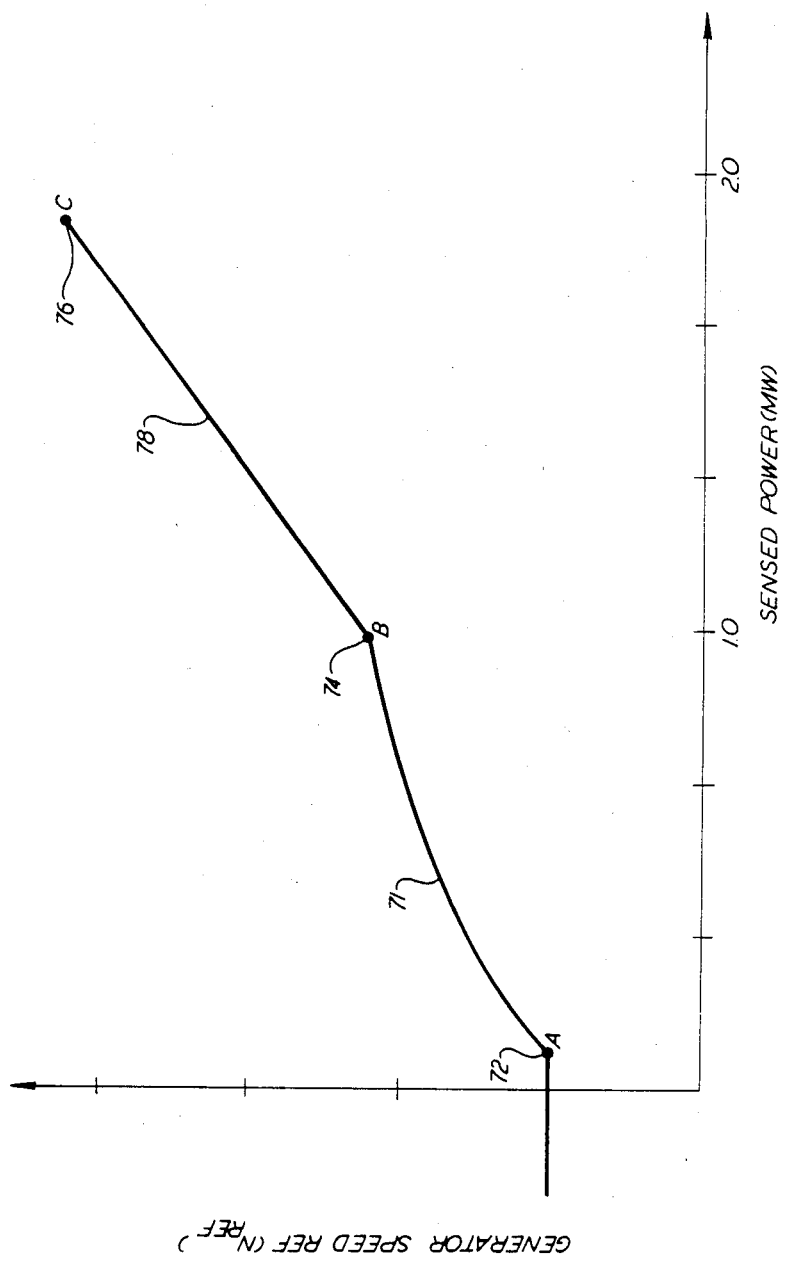
FIG. 4 is an illustration of the relation between generator output power and a selected generator speed reference signal for use in maneuvering the generator speed.

FIG. 4 is an illustration of the relationship between generator output power and reference generator speed along a line 71 for use in maneuvering the generator speed to keep the velocity ratio constant at the value which maximizes the coefficient of performance, corresponding to point 70 of FIG. 3. FIG. 4 also illustrates the manner in which speed increases when torque is held constant. For constant torque and constant velocity ratio operation as described above, aerodynamic (pitch or yaw) control would have to be used for a point 74 (B) of torque limit upward.

The locus of points forming line 71 beginning from a point 72 (A) and ending at the point 74 (B) describes the desired generator speed for various power levels for maximum efficiency during constant velocity ratio operation below the torque limit. Operation between the points 72 and 74 (A and B) corresponds to operation at the point 70 in FIG. 3. Where the desired velocity ratio is a fixed constant and the corresponding coefficient of performance is a maximum fixed constant, it is possible to compute the relation between the generator output power and the necessary generator speed to obtain that power. I.e., since power is proportional to the cube of the wind speed and since generator speed is proportional to wind speed, power is then necessarily proportional to generator speed cubed and generator speed is proportional to the cube root of power. Thus, FIG. 4, from the point 72 to point 74 along the locus of points 71 is a map which dictates the required maneuvering of generator speed relative to sensed power and, indirectly, to wind speed. Thus, by sensing generator output power and consulting the functional relation illustrated in FIG. 4, the required generator speed for maintaining the velocity ratio is obtained directly and efficiency is automatically maximized. In co-pending application U.S. Ser. No. 799,045, entitled A VARIABLE SPEED WIND TURBINE, invented by Doman et al, such a control strategy is disclosed and claimed. In that application, constant velocity ratio operation is continued at constnt torque above point B by also utilizing pitch or yaw control to modulate aerodynamic torque.

In co-pending application U.S. Ser. No. 799,046, entitled TORQUE CONTROL FOR A VARIABLE SPEED WIND TURBINE, invented by DiValentin et al, additional methodology and apparatus for increasing energy capture above the limiting torque point 74 without utilizing pitch or yaw control has been disclosed and claimed. Since that method and apparatus are fully described therein, they will be described herein only to the extent necessary to provide the general principles.

For the particular variable speed wind turbine controller described and claimed herein, the DiValentin et al teachings dictate letting the generator speed increase freely along a locus of points 78 between point 74 (B) and point 76 (C) at which point a speed or power limit is reached. Thus, although the generator air gap torque is held constant, the rotor speed is allowed to increase in such a manner as to maximize the energy capture by staying on the performance map of FIG. 3 from point 70 to point 76 along a corresponding locus of points 80. It will be observed from FIG. 3 that the velocity ratio, above the torque limit, is increasing, and the coefficient of performance is decreasing. Although the maximum efficiency represented by point 70 can no longer be held, the locus of points 80 represents the best possible efficiency which may be extracted, under the circumstances. Referring back to FIG. 4, the locus of points 78 corresponds to the locus of points 80 of FIG. 3 and similarly represents the best possible maneuvering of generator speed for given wind speeds.

Figure 5:
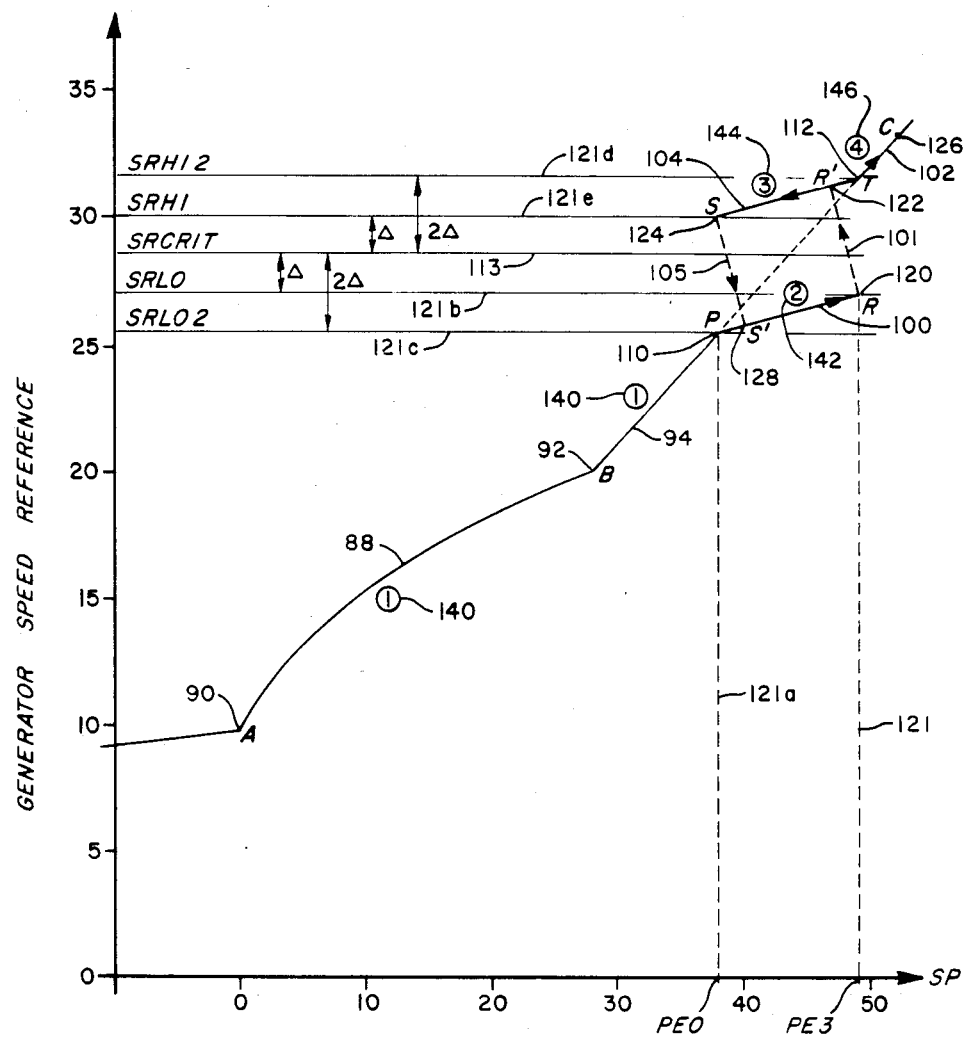
FIG. 5 represents a modification of the illustration of FIG. 4 which modification shows a critical speed avoidance technique, according to the present invention.

FIG. 5 is an illustration of the functional relation between the measured percentage of rated generator output power delivered (abscissa) and the commanded or desired generator speed (ordinate). FIG. 5 is similar in form to FIG. 4 but has been modified in a critical speed region, according to the teachings of the present invention.

As similarly explained in connection with FIG. 4, the generator speed in FIG. 5 may be maneuvered along a locus of points 88 from a point 90 (A) to a point 92 (B) to keep the velocity ratio constant at the value which maximizes the coefficient of performance. In FIG. 5, there is illustrated a different manner of maneuvering generator speed to increase power output above the point 92 (B) of torque limit from the manner shown in FIG. 4. According to the present invention, a locus of points 94, 100, 102, 104, above the torque limit (B) is other than a straight line, and may include a path which deviates from the straight line shown in FIG. 4 between a point 110 (P) and a point 112 (T) to avoid running the turbine at a critical speed ($N_T$(CRIT)), corresponding to a commanded critical speed 113 (SR CRIT). A locus of points 100 is selected from point 110(P) to point 120(R), according to the present invention, to avoid running the turbine at its critical speed ($N_T$(CRIT)) which would cause the wind turbine to resonate mechanically. The locus of points 100 need not be exactly as shown in FIG. 5 but may be any path which avoids the critical speed. It is clear that numerous possible paths may be chosen and although the following detailed description shows the manner of implementing one such path, it should be understood that the present invention is not limited to the one path described in detail below.

If, while operating on the locus of points 100, a filtered value of the sensed power exceeds a selected value 121 (PE3) and a sensed turbine rotor speed signal provided by a sensor 158 (see FIG. 1) on a line 162 exceeds a selected speed value 121b (SRLO), an immediate transition in the value of the speed reference is made from the locus of points 100 to the locus of points 104 and subsequent speed reference values are selected along the locus of points 104 between a point 124 (S) and point 112 (T). Of course, it will be understood that the generator rotor speed filtered through an appropriate low pass type filter could have been used instead of the turbine rotor speed to signal the transition. Points R on locus of points 100 and point R' on locus of points 104 represent the steady state operating conditions at the same wind speed.

After the command signal transition, as indicated by dashed line 101 from point R to point R', the actual speed of the generator will ramp up to the new commanded value at a rate determined by the integrator 66 of FIG. 2. The speed command signal will continue to be dictated according to the locus of points 104 for so long as the turbine speed stays below a selected speed value 121d (SRHI2); or, stays above a selected speed 121e (SRHI) and the sensed power stays within the ranges between a selected power value 121a (PE0) and PE3. If both the filtered sensed power exceeds PE3 at point 112 (T) and the turbine rotor speed exceeds the selected speed value 121d (SRHI2), the speed reference will be determined, above point 112, according to the locus of points 102 from points 112 (T) to 126 (C). Point 126 (C) is a speed or power limit.

If, when operating on the locus of points 104, the turbine rotor speed falls below the selected speed value 121e (SRHI) and the filtered sensed power falls below PE0, an immediate transition, as indicated by dashed line 105, is made back to the locus of points 100 from point S (124) to point 128 (S').

The Variable Speed Wind Turbine Controller 36 of FIGS. 1 and 2 will have the speed avoidance logic or methodology resident within the signal processor 37 of FIG. 1. Instructions would ordinarily be stored in ROM 44 and would be executed in conjunction with RAM 46, the CPU 38, the bus 42, the I/O Unit 40, and all of the other elements and signals shown in FIG. 1. The manner in which the signal processor 37 will carry out the steps necessary for implementing the speed avoidance technique shown in FIG. 5 is more particularly pointed out in FIGS. 6 and 7 which illustrate, respectively, a state transition diagram and a flowchart which may be coded in ROM in a language intelligible by the signal processor 37 of FIG. 1. The particular language selected is not relevant to the invention disclosed herein and will not be disclosed in detail.

Figure 6:
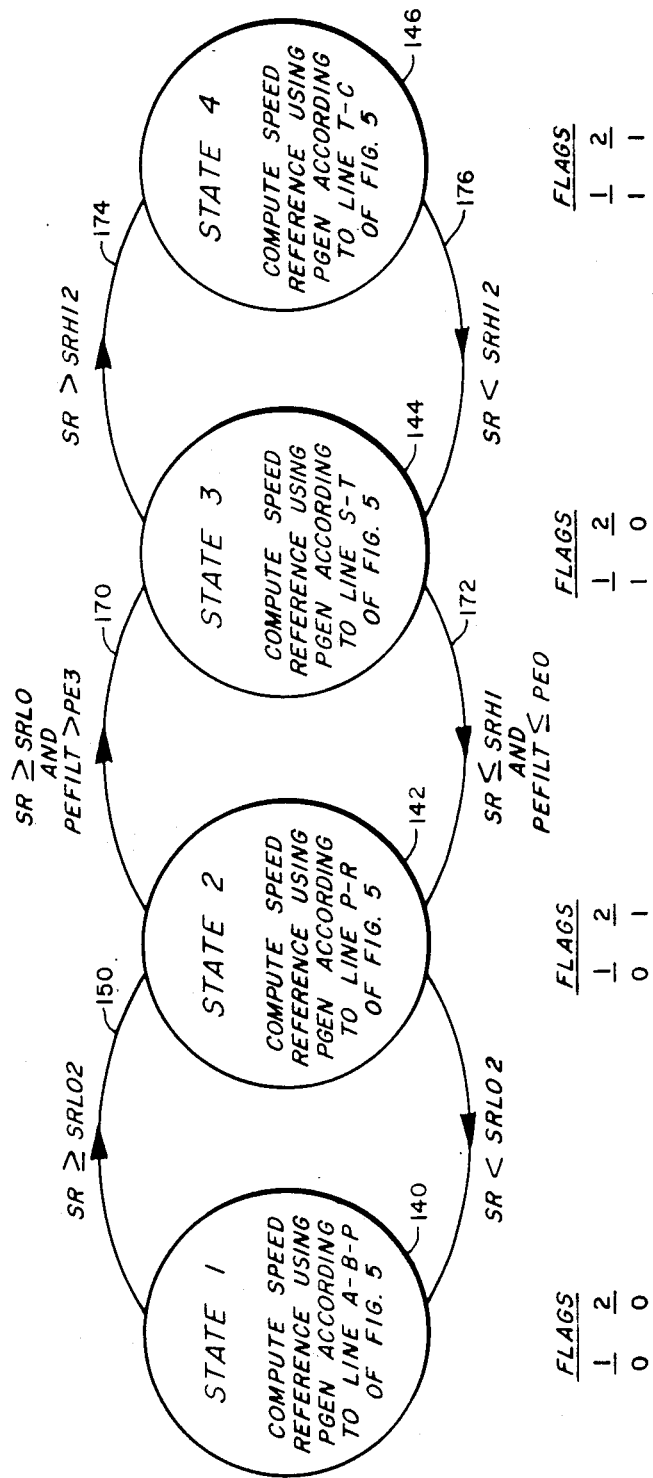
FIG. 6 is a state transition diagram showing a way of conceptualizing operation of the wind turbine generator, according to the present invention.

Referring now to FIG. 6, a state transition diagram is presented for better illustrating the schedule of FIG. 5 as a "state machine".

The speed avoidance logic is divided into four states of operation. The bit status of two binary flags, FLAG 1 and FLAG 2, is used to define the states as follows:

| FLAG 1 | FLAG 2 | STATE |
| --- | --- | --- |
| 0 | 0 | 1 |
| 0 | 1 | 2 |
| 1 | 0 | 3 |
| 1 | 1 | 4 |

STATE 1 140 is defined as operation below point 110(P) of FIG. 5, i.e., along line A-B-P. STATE 2 142 is defined as operation along line P-R, along the locus of points 100 between points 110 and 120. STATE 3 144 is defined as operation along line S-T, along the locus of points 104 between points 124 and 112. STATE 4 146 is defined as operation along line T-C, along the locus of points 102 between points 112 and 126. The transitions between states take place as a function of sensed turbine rotor speed and a filtered value of generator power as illustrated by the labeled transition lines between states.

The numbered states 140, 142, 144, and 146 of FIG. 6 are also illustrated in FIG. 5 as circled numerals in the vicinity of their corresponding loci of points. Thus, STATE 1 140 is shown as a circled numeral one near the locus of points 88 and again near the locus of points 94, while STATE 2 142 is shown in the same way in the vicinity of the locus of points 100. Similarly, STATE 3 144 is shown near the locus of points 104 and STATE 4 146 is shown near the locus of points 102.

Referring back to FIG. 6, a transition line 150 indicates a transition from STATE 1 140 to STATE 2 142 only if the wind turbine measured rotor speed is greater than or equal to a selected speed SRLO 2. A speed sensor 158 is shown in FIG. 1 providing a turbine rotor speed signal ($N_T$) on a line 162 to the I/O Unit 40 of the signal processor 37. It is desirable, in this case to provide a separate speed sensor for the turbine rotor since it has a slower response than the generator rotor and is less likely to cause undesireable state transitions due to transient generator rotor speed fluctuations. Although the various speed limits, i.e., SRHI2, SRHI, SRCRIT, SRLO, and SRLO2 of FIG. 5 are shown measured against a scale illustrating turbine rotor speed signal values, it should be understood that the generator rotor speed reference values have been scaled to take into account the gear ratio.

While in STATE 1, the signal processor 37 of FIG. 1 computes the generator speed reference signal according to the locus of points 88 and 94 of FIG. 5, i.e., according to the line A-B-P. While in STATE 2, on the other hand, the generator speed reference is computed using the locus of points 100, i.e., from point 110 to point 120 (P to R). After the transition from STATE 1 to STATE 2 the status of the flag number changes from zero to one while FLAG 1 stays at zero.

A transition may be made from STATE 2 to STATE 3 as indicated by a transition line 170. This transition will occur only if both the turbine rotor speed is greater than or equal to SRLO and a filtered value of the sensed generator output power is greater than PE3. In STATE 3 a generator speed reference is computed using the locus of points 104 in FIG. 5. A transition back to STATE 2 may be made if both the turbine rotor speed is less than or equal to SRHI and the filtered sensed generator output power signal is less than or equal to PE0. Such a transition back to STATE 2 is indicated by a transition line 172. While in STATE 3, the status of FLAG 1 is at a value of one and FLAG 2 is at a value of zero.

It will be observed that a transition from STATE 2 to STATE 3 involves a speed up of the rotor at the expense of a decrease in generator output. This is to permit, for example, the temporary storage of the energy present in a gust of wind as an increase in turbine speed. Similarly, a transition from STATE 3 to STATE 2, for example, upon the occurrance of a fall off in wind speed, results in a decrease of rotor speed and an accompanying increase of generator output power. If such transitions were permitted to occur strictly on the basis of sensed power and sensed generator speed signals, a great deal of rapid cycling could take place between STATES 2 and 3. For example, the initial generator output power pulse required to help slow the rotor in effecting the transition 105 might exceed PE3 and would result in an immediate transition from STATE 2 back to STATE 3. To avoid this sort of cycling a filtered value of sensed generator output power is used together with the slower responding turbine rotor speed in the decision making process, rather than using the acutal sensed generator output power and generator speed signal values. The frequency response characteristic of the power signal filter is that of a low pass first order lag time constant filter.

A transition may be made from operation in STATE 3 144 to STATE 4 146 if the sensed turbine rotor speed becomes greater than SRHI2 as indicated by a transition line 174. While in STATE 4 146 the speed reference is computed using the locus of points 102 of FIG. 5 between points 112 and 126. If the wind speed decreases, a transition may be made out of STATE 4 146 back to STATE 3 144, but only if the sensed turbine rotor speed become less than SRHI2, as indicated by a transition line 176. While in STATE 4 146, both FLAGS 1 and 2 are set to 1.

The state transition diagram of FIG. 6 may be carried out in a computer program implemented on a digital computer such as a special purpose signal processor 37 as illustrated in FIG. 1. The flowchart may be implemented using any of a wide variety of programming languages depending on the type of CPU selected for use in the processor 37. Of course, these details are well known in the signal processing art and need not be described here. In general, a flowchart such as is disclosed in FIG. 7, or even FIG. 6 standing alone, would be sufficient to provide a programmer with the necessary guidance for writing the necessary code.

Beginning with an entry point 200 in FIG. 7, a next step 202 is executed in which a variable PEFILT is updated to a value equivalent to the signal output value of an electrical power filter which filters the signal $P_E$ on line 52 of FIG. 1. This signal is filtered in order to prevent the cycling described above between STATES 2 and 3.

A decision step 204 is next executed in which a determination is made as to the present value of FLAG 1. If equal to zero, the "state machine" is either in STATE 1 or STATE 2. To determine which state, a decision step 206 is next executed in which the status of FLAG 2 is determined. If equal to zero, the state machine is in STATE 1 and the speed reference for the comparison made in summing junction 62 of FIG. 2 is made according to the locus of points 88 or 94 of FIG. 5, depending on the present value of the generator output power. This computation is indicated by a computational step 208 in FIG. 7. After the computation is made in step 208, a determination must next be made in a decision step 210 as to whether the turbine rotor speed is greater than or equal to the lowest speed limit SRLO2. This determines whether the speed has increased above point 110(P) of FIG. 5. If not, operation is continuing along lines A-B-P and a return to the main program can be made at a step 212. If so, then a state transition has occurred to STATE 2 and FLAG 2 is set equal to one in a step 214 before returning to the main program.

Once in STATE 2, the next execution of the subroutine shown in FIG. 7 will ordinarily provide a negative answer to the decision block question asked in step 206, indicating that the state machine is operating in STATE 2. Thus, the speed reference signal will be computed along the locus of points 100 in FIG. 5 as indicated by a computational step 216 in FIG. 7.

A decision step 218 is next executed in which a determination is made as to whether the turbine rotor speed is greater than or equal to SRLO *and* the filtered value of generator output power is greater than or equal to PE3. If not, operation is still within STATE 2 unless the turbine rotor speed has fallen below SRLO2 as determined in a decision step 220. If the speed has fallen that low, then FLAG 2 is set back equal to zero to indicate a reversion back to STATE 1. If not, a return is directly made via steo 212 to the main program. If a determination was made in step 218 that both the turbine rotor speed and the filtered value of generator output power were greater than the selected limits, then a transition to STATE 3 is indicated and FLAGS 1 and 2 are adjusted accordingly in a step 224 before a return is made in step 212.

Upon reentering the program in step 200, after updating the PEFILT variable, step 204 will, if the state machine is in STATE 3, indicate that FLAG 1 is not equal to zero and a decision step 226 will next be executed to determine whether the state machine is in STATE 3 or STATE 4. If FLAG 2 is equal to zero, then the state machine is in STATE 3 and the speed reference signal is computed according to the locus of points 104 of FIG. 5 in a computational step 228.

A decision step 230 is next executed in which a decision is made as to whether the turbine rotor speed is less than or equal to SRHI *and* PEFILT is less than or equal to PE0. If not, operation is still confined to STATE 3 unless the rotor speed is greater than or equal to SRHI2 as determined in a decision step 232. If so, a transition to STATE 4 is indicated and FLAG 2 is set equal to one in a step 234. If not, a return is made directly via step 212 to the main program.

If a determination was made in step 230 that the turbine rotor speed and the filtered value of generator output power were less than the selected limits, then a transition back to STATE 2 is indicated and FLAG 1 is set back equal to zero and FLAG 2 back to one in a step 236 before returning via step 212 to the main program.

If a determination is made in step 226 that FLAG 2 is not equal to zero, the state machine is operating in STATE 4 and the speed reference signal is computed using the locus of points 102 of FIG. 5 in a computational step 238. To determine if the state machine is still operating in STATE 4, a decision is made in a step 240 as to whether the turbine rotor speed is less than SRHI2. If not, the state machine is still operating in STATE 4 and a return is made via step 212 to the main program. If so, a transition back to STATE 3 has been made and FLAG 2 is set back to zero in a step 242 before returning via step 212 to the main program.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A critical speed avoidance method for use in controlling the speed of a variable speed wind turbine generator, comprising the steps of:

sensing the generator output power, generator speed and turbine speed and providing sensed generator power, generator speed and turbine speed signals indicative of the magnitude thereof;

controlling the generator torque in response to said sensed signals by providing a generator speed comand signal for maneuvering said generator speed as a function of sensed power by comparing the magnitude of said generator speed command signal to the magnitude of said sensed generator speed signal and providing a difference signal indicative of a difference in magnitudes therebetween, and by integrating and amplifying said difference signal and providing a generator torque command signal;

changing the magnitude of said generator speed command signal between selected generator output power signal magnitudes at a rate faster or slower than indicated by said function to a transition point between said selected generator power signal magnitudes at which power is available to provide a rapid change in generator speed; and providing, at said transition point a discontinuity in the magnitude of said generator speed command signal for inducing a rapid generator speed change through said critical speed.

2. A critical speed avoidance method for use in controlling the speed of a variable speed wind turbine, comprising the steps of:

sensing the output power of the wind turbine generator and providing a filtered output power signal (52a) having a magnitude indicative of said output power;

sensing a generator rotor speed and providing a speed signal (48) having a magnitude indicative thereof;

computing a speed command signal (60) according to a computed speed command signal versus sensed output power signal curve (88, 94, 100, 102, 104) for filtered output power signal magnitudes between first and second power levels (121a, 121) and for turbine rotor speeds between a pair of selected first and second speed limits (121c, 121b) each below the critical speed, said first speed limit being less than said second speed limit, such that the slope of said computed speed command signal versus sensed output power signal curve (100) between said first and second limits (121, 121a) is different from the slope below said first speed limit (121c); and computing a speed command signal (60) according to a computed speed command signal versus sensed output power signal curve (88, 94, 100, 102, 104) for filtered output power signal magnitudes between said first and second power levels (121, 121a) and for rotor speeds between a pair of selected third and fourth speed limits (121d, 121e) each above the critical speed, said third speed limit being less than said fourth speed limit, such that the slope of said computed speed command signal versus sensed output power signal curve (104) between said third and fourth limits is different from the slope above said fourth speed limit (121d).

3. A critical speed avoidance apparatus for controlling the speed of a variable speed wind turbine generator, comprising:

means for sensing the generator output power, generator speed, and turbine speed and for providing sensed generator power, generator speed and turbine speed signals indicative of the magnitudes thereof; and control means responsive to said sensed signals for controlling the generator torque by providing a generator speed command signal in response to said turbine speed and generator power signals, for maneuvering said generator speed as a function of sensed power by comparing the magnitude of said generator speed command signal to the magnitude of said sensed generator speed signal and providing a difference signal indicative of a difference in magnitudes therebetween, and by integrating and amplifying said difference signal and providing a generator torque command signal, said control means changing the magnitude of said generator speed command signal between selected generator output power signal magnitudes at a rate faster or slower than indicated by said function to a transition point between said selected generator power signal magnitudes at which power is available to provide a rapid change in generator speed, and providing at said transition point a discontinuity in the magnitude of said generator speed command signal for inducing a rapid generator speed change through said critical speed.

* * * * *